United States Patent [19]

Hashimoto

[11] Patent Number: 4,466,720
[45] Date of Patent: Aug. 21, 1984

[54] FOCAL-PLANE SHUTTER

[75] Inventor: Akihiko Hashimoto, Tokyo, Japan

[73] Assignee: Olympus Optical Co., Ltd., Tokyo, Japan

[21] Appl. No.: 376,746

[22] Filed: May 10, 1982

[30] Foreign Application Priority Data

| May 19, 1981 | [JP] | Japan | 56-75385 |
| May 19, 1981 | [JP] | Japan | 56-75386 |
| May 19, 1981 | [JP] | Japan | 56-75387 |
| May 19, 1981 | [JP] | Japan | 56-75388 |
| May 19, 1981 | [JP] | Japan | 56-75389 |
| May 19, 1981 | [JP] | Japan | 56-72045[U] |
| May 19, 1981 | [JP] | Japan | 56-72046[U] |

[51] Int. Cl.$^3$ ............................................. G03B 9/34
[52] U.S. Cl. ................................................ 354/244
[58] Field of Search ........................... 354/241–244

[56] References Cited

U.S. PATENT DOCUMENTS

| 2,134,766 | 11/1938 | Schieber et al. | 354/243 |
| 2,866,398 | 12/1958 | Maurer | 354/244 |
| 3,468,236 | 9/1969 | Rentschler et al. | 354/243 |
| 3,682,073 | 8/1972 | Dahlgren | 354/242 |
| 4,164,370 | 8/1979 | Kimura et al. | |
| 4,359,278 | 11/1982 | Hashimoto | 354/244 |

FOREIGN PATENT DOCUMENTS 53-135328  11/1978  Japan ............................ 354/241

Primary Examiner—John Gonzales
Attorney, Agent, or Firm—Frishauf, Holtz, Goodman & Woodward

[57] ABSTRACT

A focal-plane shutter comprises first leading and trailing cylinders rotatably disposed on the winding side and fitted with leading and trailing screens, respectively, second leading and trailing cylinders rotatably disposed on the charge side and fitted with the leading and trailing screens, respectively, gears for rotating the first leading and trailing cylinders so that the first leading and trailing cylinders are wound with the leading and trailing screens, respectively, and charge springs for rotating the second leading and trailing cylinders at shutter release so that the second leading and trailing cylinders are wound with the leading and trailing screens, respectively. The first and second leading cylinders are substantially coaxial with said first and second trailing cylinders, respectively.

23 Claims, 12 Drawing Figures

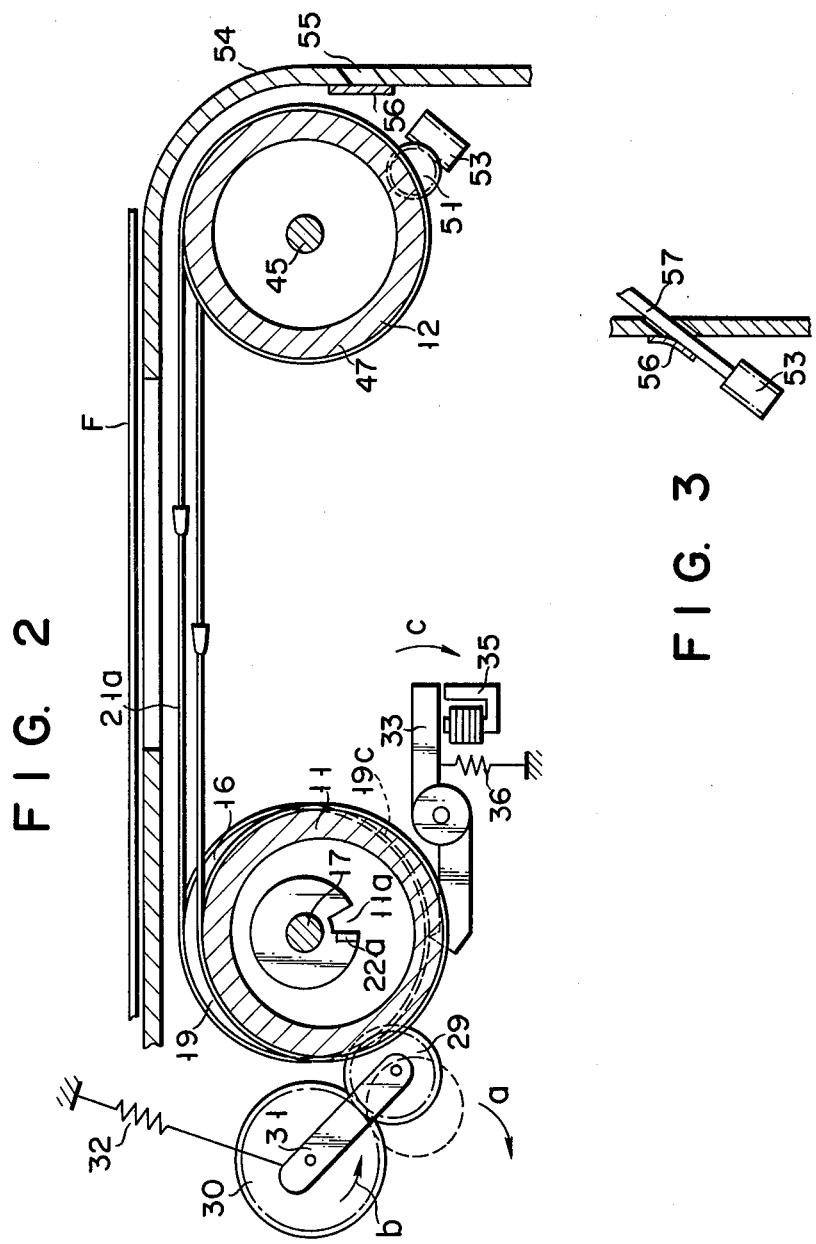

FOCAL-PLANE SHUTTER

BACKGROUND OF THE INVENTION

This invention relates to a focal-plane shutter which comprises leading and trailing screens, leading and trailing cylinders for the leading and trailing screens on the winding side, and leading and trailing cylinders for the leading and trailing screens on the charge side.

Conventional focal-plane shutters may be classified into two types; 4-shaft-type shutters in which leading and trailing cylinders on the winding and charge sides are separately arranged parallel to one another, and 3-shaft-type shutters in which only the leading and trailing cylinders on the winding side are coaxial. In the focal-plane shutters of these types, however, at least the leading and trailing cylinders on the charge side are arranged at a given longitudinal distance from each other inside a camera housing, so that a wide space should be required. Moreover, ribbons of shutter screens travel along paths which are bent substantially at an angle of 90° to the traveling direction of the shutter screens by the use of rollers and the like. Accordingly, the travel of the shutter screens is unstable, and heavy-duty charge springs are needed. Further, the components used are too many to be assembled with ease.

SUMMARY OF THE INVENTION

The object of this invention is to provide a focal-plane shutter of a camera, capable of stable shutter screen traveling without requiring any substantial setting space, and simplified in construction.

A focal-plane shutter according to this invention is characterized in that leading and trailing cylinders on the charge side, as well as those on the winding side, are rotated substantially coaxially.

In such construction, the cylinders on both the winding and charge sides may be arranged substantially on the same plane to reduce the setting space. Since the paths of ribbons of shutter screens need not be bent at an angle of 90° by using rollers or the like, the inertia may be reduced, and it is unnecessary to use any heavy-duty charge springs. Thus, the travel of the shutter screens may be stabilized.

In the shutter of this invention, the leading and trailing cylinders on the winding side may be "substantially" coaxial because minimal eccentricity will not constitute any hindrance to practical use. Naturally, the leading and trailing cylinders on the charge side may also be eccentric to some degree.

BRIEF DESCRIPTION OF THE DRAWINGS

FIG. 2 is a schematic cross-sectional view for illustrating the winding operation of the shutter;

FIG. 3 is a sectional view showing part of a charge spring adjusting mechanism;

FIGS. 7 and 8 show a modification of a stop mechanism for leading and trailing cylinders, in which FIG. 7 is a general sectional view, and FIG. 8 is an enlarged partial sectional view;

FIGS. 9 and 10 show a modification of the ratchet mechanism, in which FIG. 9 is a general sectional view, and FIG. 10 is an enlarged partial sectional view.

DETAILED DESCRIPTION OF THE PREFERRED EMBODIMENT

Now there will be described a focal-plane shutter of a single-lens reflex camera according to an embodiment of this invention with reference to the accompanying drawings.

Figure 1:
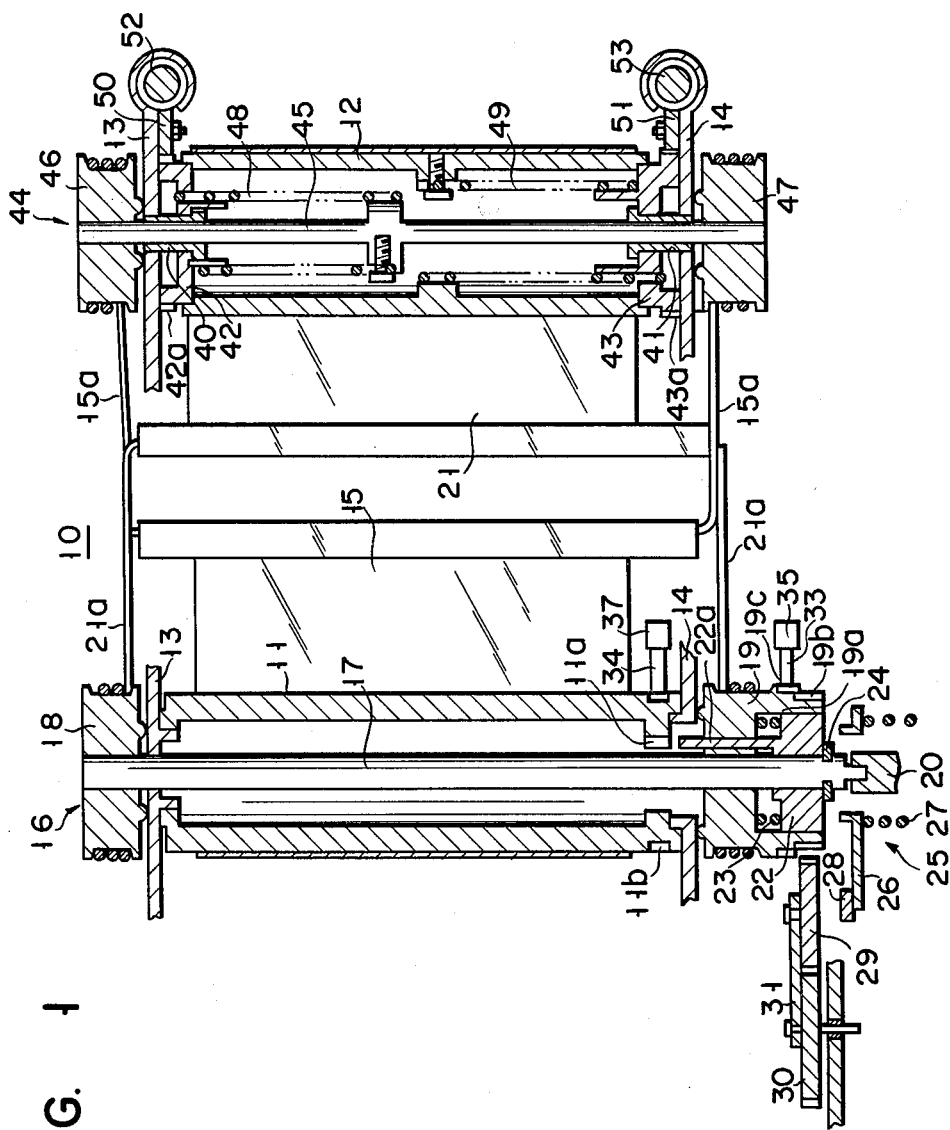
FIG. 1 is a longitudinal-sectional view of a focal-plane shutter according to an embodiment of this invention.

In FIG. 1, numeral 10 designates a focal-plane shutter which is disposed inside a camera housing so as to be located in front of a film. The shutter 10 includes a trailing cylinder 11 on the winding side and a leading cylinder 12 on the charge side which are arranged at a predetermined distance from each other. The trailing cylinder 11 is rotatably supported at its upper and lower ends on support plates 13 and 14, respectively, of the camera housing, and can be wound with a trailing screen 15, which is connected to the cylinder 11 on one end side, as it is rotated. A shaft 17 of a leading cylinder 16 is passed through the trailing cylinder 11. The upper end portion of the shaft 17 extends through the upper support plate 13, and a cylindrical winding section 18 is coaxially attached to the extended end. On the other hand, the lower end portion of the shaft 17 extends through the lower support plate 14, and a cylindrical winding section 19 is coaxially attached to the middle of the lower end portion. The extended end of the shaft 17 is fitted in a recess formed in the top surface of a support plate 20. Thus, the leading cylinder 16 constructed by the shaft 17 and the winding sections 18 and 19 is sustained by the support plates 13 and 20 so as to be rotatable about the central axis of the shaft 17. As the leading cylinder 16 is rotated, leading screen ribbons 21a of a leading screen 21 may be wound on the winding sections 18 and 19, severally.

The winding sections 18 and 19 of the leading cylinder 16 are equal to the trailing cylinder 11 in outside diameter. As shown in FIG. 2, the rotation axis of the trailing cylinder 11 is deviated a little from the rotation axis of the leading cylinder 16 in the forward direction, that is, in the opposite direction to the traveling direction of a film F or shutter screens.

Since the first leading and trailing cylinders 16 and 11 on the winding side are disposed in such a longitudinally eccentric manner, the approaches for the leading and trailing screens can be lengthened without varying the outside diameter of the cylinders, thus stabilizing the shutter screen traveling.

A circular recess 19a is formed in the under surface of the lower winding section 19 of the leading cylinder 16, and a cylindrical sliding member 22 having a center hole in which the lower end of the shaft 17 is inserted is vertically slidably contained in the recess 19a. Interposed between the top surface of the sliding member 22 and the bottom surface of the recess 19a of the winding section 109 is a compression coil spring 23 which urges the sliding member 22 downward. A stopper 24 projects in the vicinity of the lower end of the shaft 17 so as to abut against the under surface of the sliding member 22, thereby restraining the downward slide of the winding member 22 by the urging force of the coil spring 23. An engaging member in the form of an engaging strip 22a protrudes integrally from the top surface of the sliding member 22. The engaging strip 22a is passed through a vertical hole bored through the winding section 19 so that its upper end can engage an engaging portion 11a protruding from the inner peripheral surface of the trailing cylinder 11. Namely, when the sliding member 22 is raised against the urging force of the coil spring 23 by a driving member 25 as mentioned later, an engaging portion in the form of the engaging strip 22a engages the engaging portion 11a to transmit the rotation moment of the leading cylinder 16 to the trailing cylinder 11, thereby causing the cylinders 16 and 11 to rotate together. The driving member 25, which faces the under surface of the sliding member 22, comprises a moving plate 26 (i.e., an "abutting member") vertically movably supported by the camera housing and a compression coil spring 27 (urging member) to urge the moving plate 26 upward. The top surface of the moving plate 26 is engaged with an operating member 28 which is rocked upward at the time of shutter release (i.e., depressing a shutter release button of a camera), and is moved downward to move the moving plate 26 downward against the urging force of the coil spring 27 in synchronism with the upward rocking of a conventional movable mirror for film exposure. The coil spring 27 for the moving plate 26 has a spring coefficient greater than that of the coil spring 23 for the sliding member 22. Thus, when the operating member 28 is non-operating, the sliding member 22 is held in an up position by the coil spring 27 for the moving plate 26 to cause the first trailing cylinder 11 to engage the first leading cylinder 16.

Gear teeth 19b are circumferentially formed on the outer peripheral surface of the lower winding section 19 of the leading cylinder 16. A planet gear 29 can be brought in mesh with the gear teeth 19b. As shown in detail in FIG. 2, the planet gear 29 is in mesh with a sun gear 30, and is rotatably mounted on one end of a swinging lever 31. Inserted in the vicinity of the other end of the swinging lever 31 is a center pin integral with the sun gear 30 and rotatably supported by a support plate. Further, the other end of the swinging lever 31 is connected with a tension spring 32 which urges the lever 31 to rock in the direction indicated by arrow a. The sun gear 30 is connected with a winding lever of the camera by means of a coupling mechanism (not shown). As the winding lever is rocked, the sun gear 30 is rotated counterclockwise or in the direction indicated by arrow b. Accompanying the counterclockwise rotation of the sun gear 30, the planet gear 29 is rotated clockwise and rocked in the opposite direction to the direction indicated by arrow a against the urging force of the spring 32 to be in mesh with the gear teeth 19b of the winding section 19. Then, the rotation moment of the sun gear 30 is transmitted to the winding section 19 to rotate the same. As a result, the leading and trailing screens 21 and 15 are wound on the leading and trailing cylinders 16 and 11, respectively.

Engaging gear teeth 19c are formed on the outer peripheral surface of the lower winding section 19 of the leading cylinder 16, while engaging gear teeth 11b are formed on the outer peripheral surface of the trailing cylinder 11. The tip ends of stop levers 33 and 34 abut against the gear teeth 19c and 11b, respectively. These levers 33 and 34 are intended to maintain the winding state of the leading and trailing cylinders 16 and 11. Since the levers 33 and 34 are of the same construction and function in quite the same manner, only the stop lever 33 for the leading cylinder 16 will be described with reference to the drawing of FIG. 2.

The stop lever 33 is pivotally mounted at the middle on a support plate so as to be rockable within a horizontal plane. An electromagnet 35 with a permanent magnet core, that is, a release-type electromagnet, is provided in the vicinity of the rear end of the lever 33 to urge normally the lever 33 to rock in the direction indicated by arrow c. Further, the lever 33 is connected with a tension spring 36, which also urges the lever 33 to rock in the direction indicated by arrow c. Normally, therefore, the tip end of the lever 33 is in contact with the gear teeth 19c of the winding section 19. The urging forces of the permanent magnet and the tension spring 36 allow the winding section 19 and hence the leading cylinder 16 to rotate when a rotation moment is applied to the winding section 19 for winding, and cause the tip end of the stop lever 33 to engage the gear teeth 19c to prevent the rotation of the leading cylinder 16 against the urging force of a charge spring as mentioned later when the winding action is ended. When the electromagnet 35 is energized by a power source (not shown), the stop lever 33 is rocked in the direction opposite to the direction indicated by arrow c, and the winding section 19 is disengaged from the gear teeth 19c. Another combination of such release-type electromagnet and tension spring is provided for the stop lever 34 for the trailing cylinder 11. In FIG. 1, only the electromagnet as designated by numeral 37 is shown, and the tension spring is omitted.

The stop levers 33 and 34 are intended to determine the times for the travel of the leading and trailing screens 21 and 15, respectively. These times are determined when the electromagnets 35 and 37 are energized at predetermined times following the shutter release.

Now there will be described the charge side of the focal-plane shutter.

As shown in FIG. 1, cylindrical bearings 40 and 41 are penetratingly fixed to the upper and lower support plates 13 and 14, respectively, and cylindrical rotating support members 42 and 43 are coaxially rotatably supported outside the bearings 40 and 41, respectively. The peripheral edges of the rotating support members 42 and 43 are in contact with the upper and lower ends, respectively, of the second leading cylinder 12. Thus, the leading cylinder 12 is coaxially rotatably supported by the support members 42 and 43. A shaft 45 of a trailing cylinder 44 is coaxially rotatably supported inside the bearings 40 and 41. Cylindrical winding sections 46 and 47 to be wound with trailing screen ribbons 15a of the trailing screen 15 are coaxially attached to the upper end portion of the shaft 45 protruding from the one bearing 40 and the lower end portion of the shaft 45 protruding from the other bearing 41, respectively.

Disposed inside the leading cylinder 12 are two charging coil springs 48 and 49 which extend coaxially with the shaft 45 to surround the same. The one coil spring 48 has its upper and lower ends received respectively by the upper rotating support member 42 and an outward flange portion projecting at the middle of the shaft 45, thereby urging the trailing cylinder 44 to rotate and be wound with the trailing screen 15. The other coil spring 49 has its upper and lower ends received, respectively, by an inward flange portion projecting from the inner peripheral surface of the leading cylinder 12 and the lower rotating support member 43, thereby urging the leading cylinder 12 to rotate and be wound with the leading screen 21. Moreover, the one coil spring 48 is so designed and located that the distance between the inner peripheral side of the coil spring 48 and the outer peripheral surface of the shaft 45 is shorter than the distance between the outer peripheral side of the coil spring 48 and the inner peripheral surface of the leading cylinder 12. The other coil spring 49 is so designed and located that the distance between the inner peripheral side of the coil spring 49 and the outer peripheral surface of the shaft 45 is longer than the distance between the outer peripheral side of the coil spring 49 and the inner peripheral surface of the leading cylinder 12. Thus, even though somewhat extended in outside diameter, the coil spring 48 for the trailing screen will be prevented from abutting against the inner peripheral surface of the leading cylinder 12 to make the rotation of the leading cylinder 12 unstable. Likewise, even though somewhat reduced in inside diameter, the coil spring 49 for the leading screen will be prevented from abutting against the outer peripheral surface of the shaft 45 of the trailing cylinder 44 to hamper the rotation of the trailing cylinder 44.

Small gears 50 and 51 are rotatably mounted on the under surface of the support plate 13 and the top surface of the support plate 14, respectively. Gear teeth 42a and 43a are formed on the outer peripheral surfaces of the rotating support members 42 and 43, respectively. These gear teeth 42a and 43a are in mesh with the small gears 50 and 51, respectively. Worms 52 and 53 are rotatably mounted on the support plates 13 and 14, respectively. These worms 52 and 53 engage the small gears 50 and 51, respectively, to form worm gears, which constitute charge spring adjusting mechanisms between the winding sections of the trailing cylinder 44 and the leading cylinder 12. The adjusting mechanisms rock the worms 52 and 53 to rock the rotating support members 42 and 43 through the small gears 50 and 52, thereby adjusting the urging force of the charge springs 48 and 49. The same effect may be obtained by engaging the worms 52 and 53 directly with the gear teeth 42a and 43a of the rotating support members 42 and 43 without the interposition of the small gears 50 and 51.

In FIG. 2, numeral 54 designates a partition wall which protrudes from the back side of the camera housing so as to isolate the charge-side leading cylinder 12 of the shutter from a film storage section. Piercing holes 55 extending substantially straight from the outside to the inside are bored through that portion of the partition wall 54 near the worms 52 and 53. A flexible blocking member 56 is attached at one end to the inner side of the partition wall 54 so as to block up each piercing hole 55. In such construction, the blocking member 56 may be pushed open with the tip of a screwdriver 57 inserted into the piercing hole 55, as shown in FIG. 3. Then, the tip of the screwdriver 57 can reach the worm 52 or 53. As a result, the worm 52 or 53 can be rotated by the screwdriver 57 to adjust the spring force of the charge spring 48 or 49. Accordingly, it is possible to adjust the urging force of the charge spring from the outside of the camera housing by means of the adjusting mechanism to regulate the traveling speeds of the shutter screens after all parts are assembled. The worm gears for the adjusting mechanisms allow the rotation moment from the worm side to be transmitted to the rotating support members, the rotation of the rotating support members by the urging force of the charge springs can be prevented by the worms.

Referring now to FIGS. 4 to 6A and 6B, there will be described a ratchet mechanism for securing by stages the width of a slit defined between the leading and trailing screens as the slit is widened at shutter release.

Figure 4:
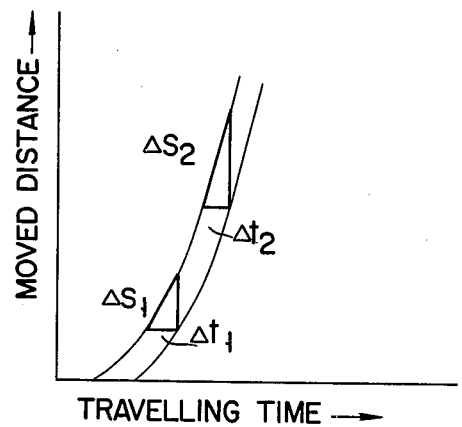
FIG. 4 is a diagram for illustrating the traveling speeds of leading and trailing screens.
Figure 5:
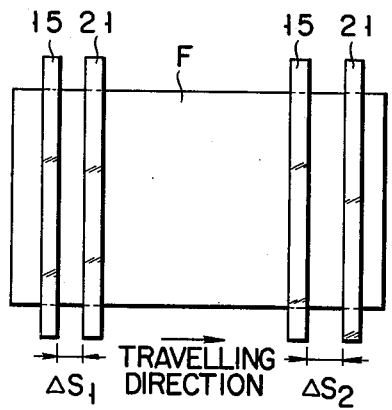
FIG. 5 is a schematic view for illustrating a slit space between shutter screens.
Figure 6A:
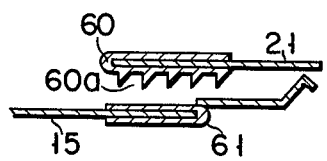
FIGS. 6A and 6B are sectional views showing different operating states of a ratchet mechanism for securing the slit space between the shutter screens.
Figure 6B:
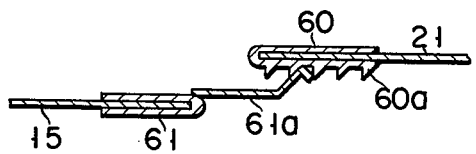

In general, the relationship between the moved distance and traveling time of a shutter screen is as shown in FIG. 4. Namely, the moving speed of the shutter screen is low at the start of travel and is increased by inertia immediately before the end of travel. Thus, the slit space S1 between the leading and trailing screens 21 and 15 obtained at the start of the travel must be wider than the slit space S2 obtained immediately before the end of the travel, as shown in FIG. 5. There will be no trouble if the moving speeds of the leading and trailing screens 21 and 15 are entirely coincident. However, there is quite a small difference between those moving speeds due to the variation in spring force, inertia, etc. Since the slit space is narrow with high shutter speed, such as 1/1,000 sec or 1/2,000 sec, the small difference in the moving speed will exert a great influence on the exposure. Especially, if the trailing screen travels faster than the leading screen, there will be no exposure because these two screens will overlap each other immediately before the end of the travel. In order to prevent such trouble, there is provided the ratchet mechanism, as shown in FIGS. 6A and 6B, which allows the slit space to be widened during the shutter screen travel, and restrains by stages the slit space from being narrowed. This ratchet mechanism is composed of a sawtoothed engaging portion 60a formed on a connector 60 of the leading screen 21, and an engaging pin 61a protruding from a connector 61 of the trailing screen 15. Before and after the travel of the shutter screens, the engaging portion 60a and the engaging pin 61a are not engaged, as shown in FIG. 6A. Even while the shutter screens are traveling in the direction indicated by the arrow, the tip end of the engaging pin 61a slides on the surface of the engaging portion 60a without engaging the same if the traveling speed of the trailing screen 15 is lower than that of the leading screen 21. As a result, the slit space defined between the connectors 60 and 61 is widened. If the traveling speed of the trailing screen 15 becomes higher than that of the leading screen 21, then the engaging pin 61a engages that sawtooth (third one in FIG. 6B) which directly faces the engaging pin 61a, so that the connector 61 of the trailing screen 15 is prevented from further approaching the connector 60 of the leading screen 21 to narrow the slit space. There will now be explained a specific case in which the sawtooth pitch is 0.5 mm, and the slit space between the shutter screens is 1 mm at the start of the travel, 1.5 mm in the middle, and 2 mm immediately before the end. If the trailing screen 15 travels faster when the slit space is 1 mm to 1.5 mm during the travel of the shutter screens, the engaging pin 61a engages the third sawtooth of the engaging portion 60a to keep the slit space from being reduced to less than 1 mm. Likewise, the engaging pin 61a engages the fourth sawtooth with the slit space ranging from 1.5 mm to 2 mm, and the fifth sawtooth with the slit space ranging from 2 mm to 2.5 mm, thereby keeping the slit space from being reduced to less than 1.5 mm and 2 mm, respectively. Thus, the ratchet mechanism of the aforementioned construction can effectively secure the slit space by stages.

There will now be described a modification of the focal-plane shutter according to the above-mentioned embodiment.

Figure 7:
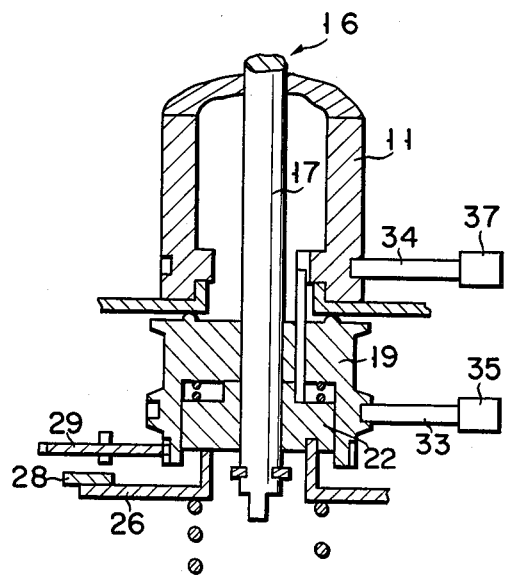
Figure 8:
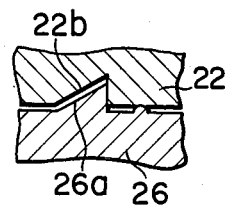

FIG. 7 shows a modification of the sliding member 22 which uses electromagnets of a type to exhibit attraction only when energized with electric current instead of the release-type ones for the electromagnet 37 of the stop lever 34 for the trailing cylinder 11 and the electromagnet 35 of the stop lever 33 for the leading cylinder 16. In this case, it is necessary that the leading and trailing cylinders 16 and 11 be held against the urging force of the charge springs without energizing the electromagnets 35 and 37 when the leading and trailing screens are wound. The sliding member 22 can perform such function. Formed on the bottom surface of the sliding member 22 is a one-way engaging groove 22b having a saw-toothed section and in the form of a ring round the shaft 17, as shown in FIG. 8. Formed on the top end of the moving plate 26 is an engaging projection 26a which engages the engaging groove 22b to prevent the sliding member 22 from rotating in one direction, that is, the opposite direction to the rotating direction for winding direction. Thus, in such a modification of construction, when a rotation moment is applied through the planet gear 29 to the leading cylinder 16 by the winding lever, the surface of the engaging groove 22b slides on the tip of the engaging projection 26a to allow the leading cylinder 16 to rotate in one direction and be wound with the leading screen. At the same time, the trailing cylinder 11 is rotated in the same direction with the aid of the engaging strip 22a and is wound with the trailing screen. After the winding action is ended, although the leading and trailing cylinders 16 and 11 are subjected to a rotation moment in the opposite direction by the charge springs, they are prevented from rotating due to the engagement between the engaging groove 22b and the engaging projection 26a. Subsequently, when the shutter is released, the electromagnets 35 and 37 are energized, and the leading and trailing cylinders 16 and 11 are held by the engagement of the stop levers 33 and 34. Further, the mirror is raised, and the operating member 28 is lowered to disengage the engaging groove 22b from the engaging projection 22a. In this state, the one electromagnet 35 is de-energized, and the leading screen starts to travel. After the passage of a predetermined time, the other electromagnet 37 is de-energized, and the trailing screen starts to travel to provide a given exposure time.

Figure 10:
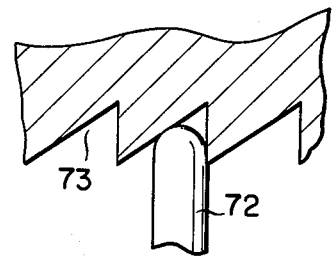
Figure 9:
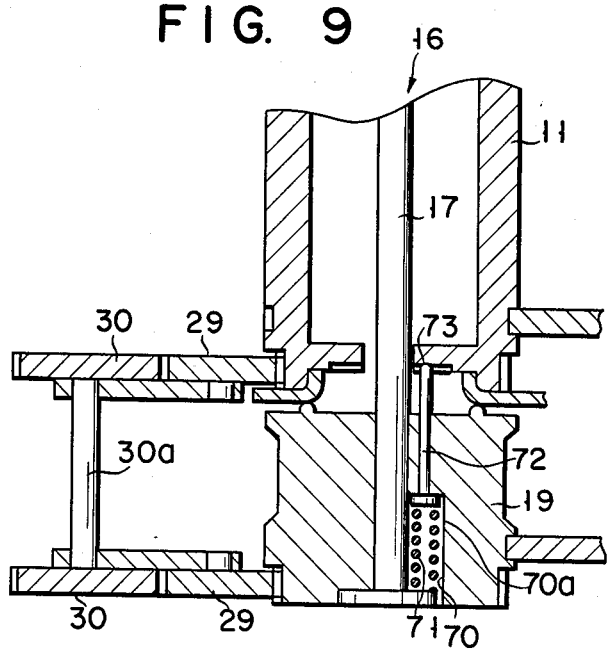

FIG. 9 shows a modification of the ratchet mechanism for securing the slit space between the shutter screens by stages. This ratchet mechanism is not attached to the connectors of the shutter screens, and is formed between the lower winding section 19 of the leading cylinder 16 and the trailing cylinder 11. A stepped piercing hole 70 extends from the under surface of the winding section 19 to its top surface, and a compression coil spring 71 is contained in a lower large-diameter portion 70a of the hole 70. The winding section 19 is further provided with an engaging rod 72 which is urged upward by the coil spring 71 so that its bottom flange portion is located inside the large-diameter portion 70a and that its upper end projects upward from an upper small-diameter portion of the piercing hole 70. Formed on the bottom surface of the trailing cylinder 11 is a one-way engaging groove 73 having a saw-toothed section and in the form of a ring round the shaft 17. The upper end of the engaging rod 72 normally abuts against the engaging groove 73, as shown in FIG. 10. The engaging groove 73 is so designed that an approaching sawtooth engages the engaging rod 72 to cause the trailing cylinder 11 to rotate and follow the leading cylinder 16 when the shutter screens travel and the trailing cylinder 11 comes to rotate faster than the leading cylinder 16. In this case, the rotations of the trailing and leading cylinders 11 and 16 at winding will not be influenced by the difference in the rotation speed. Thus, the slit space is prevented by stages from being narrowed when the rotation speed of the trailing cylinder 11, that is, the traveling speed of the trailing screen, is made faster.

In this modification, a sliding member for transmitting the rotation moment of the leading cylinder 16 to the trailing cylinder 11 at winding is not provided. Instead, a driving mechanism consisting of the planet gear 29 and the sun gear 30 is provided for each of the cylinders 11 and 16 to rotated the same directly. The respective sun gears 30 of the two driving mechanisms are connected by means of a shaft 30a so that the one gear 30 may be rotated by applying a driving force to the other.

Figure 11:
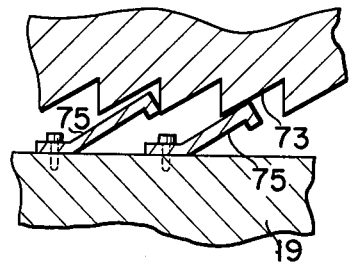
FIG. 11 is a sectional view showing another modification of the ratchet mechanism.

In the modification shown in FIGS. 9 and 10, the single engaging rod 72 urged by the compression coil spring 71 is used for the engaging means. Alternatively, however, a leaf spring may be provided so as to protrude from the top surface of the winding section 19. The engaging means is not limited to one in number, and may be two or more. FIG. 11 shows a modification using two engaging means. In this modification, the engaging means are composed of a pair of leaf springs 75 with their proximal ends fixed on the top surface of the winding section 19 and their distal ends projected circumferentially and arranged at a given distance from each other. The distance between these leaf springs 75 and the pitch of the sawteeth of the engaging groove 73 are so set that the distal end of one of the leaf springs 75 lies halfway between two adjacent sawteeth of the engaging groove 73 when the distal end of the other engages another sawtooth. With such arrangement, the slit space between the shutter screens can be prevented by closer stages from being narrowed.

What is claimed is:

1. In a focal-plane shutter comprising:
   leading and trailing screens;
   first leading and trailing cylinders rotatably disposed on the winding side of the shutter and coupled to the leading and trailing screens, respectively;
   second leading and trailing cylinders rotatably disposed on the charge side of the shutter and coupled to the leading and trailing screens, respectively;
   first driving means for rotating the first leading and trailing cylinders so that the first leading and trailing cylinders are wound with the leading and trailing screens, respectively; and
   second driving means for rotating the second leading and trailing cylinders at shutter release so that the second leading and trailing cylinders are wound with the leading and trailing screens, respectively,
   the improvement wherein:
   said first and second leading cylinders are substantially coaxial with said first and second trailing cylinders, respectively; and
   position regulating means is coupled between said first leading and trailing cylinders for directly supporting and regulating the positions of said first leading and trailing cylinders so that they are maintained substantially coaxial with each other, said position regulating means including a support plate provided between said first leading and trailing cylinders for directly supporting said first leading and trailing cylinders.

2. A focal-plane shutter according to claim 1, wherein said second driving means includes a leading screen driving charge spring disposed inside the second leading cylinder to rotate the second leading cylinder by its urging force, and a trailing screen driving charge spring disposed inside the second leading cylinder to rotate the second trailing cylinder by its urging force.

3. A focal-plane shutter according to claim 1, wherein said first leading cylinder includes a winding section disposed axially parallel to the first trailing cylinder; and said first driving means includes a coupling member attached to the first leading cylinder so as to be capable of axial movement and bound to rotate as the first leading cylinder rotates, an engaging portion formed on the first trailing cylinder for engaging the coupling member when the same is moved axially and to rotate the first trailing cylinder through the rotation of the coupling member, and a driving mechanism for axially moving the coupling member when a mirror of a photographic device in which the focal plane shutter is used, is moved.

4. A focal-plane shutter according to claim 3, wherein said first driving means includes a shifting member for axially shifting the coupling member at shutter release to disengage the coupling member from its engaging position with the first trailing cylinder.

5. A focal-plane shutter according to claim 4, wherein said driving mechanism includes a movable abutting plate which is movable to abut against the coupling member to bring the same into an engaged state, an urging member for urging the abutting plate to bring the coupling member into the engaged state, and an operating member for moving the abutting plate against the urging force of the urging member during an ascending action of a movable mirror.

6. A focal-plane shutter according to claim 5, wherein said first driving means includes an engaging portion disposed between the coupling member and the abutting plate and causing the coupling member to engage the abutting plate at the end of shutter winding, thereby preventing the coupling member from rotating.

7. A focal-plane shutter according to claim 1, wherein said leading and trailing screens are provided with a ratchet mechanism coupled between their facing sections for securing by stages the width of a slit defined between the leading and trailing screens as the slit is widened.

8. A focal-plane shutter according to claim 1, further comprising a ratchet mechanisssm coupled between said first leading and trailing cylinders for securing by stages the width of a slit defined between the leading and trailing screens as the slit is widened.

9. A focal-plane shutter according to claim 8, wherein said first leading cylinder includes a winding section coaxial with said first trailing cylinder and having a surface facing one end face of the first trailing cylinder, and said ratchet mechanism includes a saw-toothed portion formed on said one end face of the first trailing cylinder and an engaging pin provided on said surface of the first leading cylinder and elastically in contact with the saw-toothed portion.

10. A focal-plane shutter according to claim 1, wherein said first driving means includes a gear formed on the first leading cylinder and a planet gear capable of being in mesh with said gear, the planet gear including means for causing said planet gear to engage the gear on the first leading cylinder to rotate the same at winding of the leading and trailing screens, and to cause said planet gear to be disengaged from the gear on the first leading cylinder at shutter release.

11. A focal-plane shutter according to claim 10, wherein said first driving means includes a gear formed on the first trailing cylinder, another planet gear adapted to mesh with said gear on the first trailing cylinder, and a member for interlocking said two planet gears.

12. A focal-plane shutter according to claim 1, wherein said second driving means includes a leading cylinder charge spring for driving the second leading cylinder, a trailing cylinder charge spring for driving the second trailing cylinder, adjusting mechanisms for adjusting the spring force of said charge springs, and straight piercing holes penetrating a camera housing so that the adjusting mechanism may be adjusted from outside the camera housing through the piercing holes.

13. A focal-plane shutter according to claim 12, wherein said second trailing cylinder includes a pair of winding sections each having a surface to face each corresponding end face of the second leading cylinder, and said adjusting mechanisms include a leading cylinder charge spring adjusting mechanism disposed between one of the winding sections of the second trailing cylinder and the second leading cylinder, and a trailing cylinder charge spring adjusting mechanism disposed between the other winding section of the second trailing cylinder and the second leading cylinder.

14. A focal-plane shutter according to claim 13, wherein each of said leading and trailing cylinder charge spring adjusting mechanisms has one end of each said charge spring corresponding thereto, and includes a rotatable support member coaxial with said second leading and trailing cylinders and being rockable independently thereof, gear teeth formed on the outer peripheral surface of the rotatable support member, and a worm operatively engaging the gear teeth to rotate the rotatable support member.

15. A focal-plane shutter according to claim 12, further comprising a partition wall for film storage through which said piercing hole is bored.

16. In a focal-plane shutter comprising:
leading and trailing screens;
first leading and trailing cylinders rotatably disposed on the winding side of the shutter and coupled to the leading and trailing screens, respectively;
second leading and trailing cylinders rotatably disposed on the charge side of the shutter and coupled to the leading and trailing screens, respectively;
first driving means for rotating the first leading and trailing cylinders so that the first leading and trailing cylinders are wound with the leading and trailing screens, respectively; and
second driving means for rotating the second leading and trailing cylinders at shutter release so that the second leading and trailing cylinders are wound with the leading and trailing screens, respectively, the improvement wherein:
said first leading and trailing cylinders being rotatably mounted, and said second leading and trailing cylinders being rotatably mounted;
said first leading cylinder has substantially the same outside diameter as that of said first trailing cylinder, and includes a winding section eccentric to the first trailing cylinder along a direction substantially at right angles to the traveling directions of the leading and trailing screens; and position regulating means is coupled between said first leading and trailing cylinders for directly supporting and regulating the positions of said first leading and trailing cylinders so that they are maintained substantially coaxial with each other, said position regulating means including a support plate provided between said first leading and trailing cylinders for directly supporting said first leading and trailing cylinders.

17. A focal-plane shutter according to claim 16, wherein said first leading cylinder includes a winding section disposed axially parallel to the first trailing cylinder; and said first driving means includes a coupling member attached to the first leading cylinder so as to be capable of axial movement and bound to rotate as the first leading cylinder rotates, an engaging portion formed on the first trailing cylinder for engaging the coupling member when the same is moved axially and to rotate the first trailing cylinder through the rotation of the coupling member, and a driving mechanism for axially moving the coupled member when a mirror of a photographic device in which the focal plane shutter is used, is moved.

18. A focal-plane shutter according to claim 17, wherein said first driving means includes a shifting member for axially shifting the coupling member at shutter release to disengage the coupling member from its engaging position with the first trailing cylinder.

19. A focal-plane shutter according to claim 18, wherein said driving mechanism includes a movable abutting plate which is movable to abut against the coupling member to bring the same into an engaged state, an urging member for urging the abutting plate to bring the coupling member into the engaged state, and an operating member for moving the abutting plate against the urging force of the urging member during an ascending action of a movable mirror.

20. In a focal-plane shutter comprising:
leading and trailing screens;
first leading and trailing cylinders rotatably disposed on the winding side of the shutter and coupled to the leading and trailing screens, respectively;
second leading and trailing cylinders rotatably disposed on the charge side of the shutter and coupled to the leading and trailing screens, respectively;
first driving means for rotating the first leading and trailing cylinders so that the first leading and trailing cylinders are wound with the leading and trailing screens, respectively; and
second driving means for rotating the second leading and trailing cylinders at shutter release so that the second leading and trailing cylinders are wound with the leading and trailing screens, respectively, the improvement wherein:
said first leading cylinder is substantially coaxial with said first trailing cylinder and said second leading cylinder is substantially coaxial with said second trailing cylinder;
said first leading cylinder includes a winding section disposed axially parallel to the first trailing cylinder; and
said first driving means includes a coupling member attached to the first leading cylinder so as to be capable of axial movement and bound to rotate as the first leading cylinder rotates, an engaging portion formed on the first trailing cylinder for engaging the coupling member when the same is moved axially and to rotate the first trailing cylinder through the rotation of the coupling member, and a driving mechanism for axially moving the coupling member when a mirror of a photographic device in which the focal plane shutter is used, is moved.

21. In a focal-plane shutter comprising:
leading and trailing screens;
first leading and trailing cylinders rotatably disposed on the winding side of the shutter and coupled to the leading and trailing screens, respectively;
second leading and trailing cylinders rotatably disposed on the charge side of the shutter and coupled to the leading and trailing screens, respectively;
first driving means for rotating the first leading and trailing cylinders so that the first leading and trailing cylinders are wound with the leading and trailing screens, respectively; and
second driving means for rotating the second leading and trailing cylinders at shutter release so that the second leading and trailing cylinders are wound with the leading and trailing screens, respectively, the improvement wherein:
said first leading cylinder is substantially coaxial with said first trailing cylinder and said second leading cylinder is substantially coaxial with said second trailing cylinder;
said first leading cylinder includes a winding section coaxial with said first trailing cylinder and having a surface facing one end of the first trailing cylinder; and
a ratchet mechanism is coupled between said first leading and trailing cylinders for securing by stages the width of a slit defined between the leading and trailing screens as the slit is widened, said ratchet mechanism including a saw-toothed portion formed on said one end face of the first trailing cylinder and an engaging pin provided on said surface of the first leading cylinder and elastically in contact with the saw-toothed portion.

22. In a focal-plane shutter comprising:
leading and trailing screens;
first leading and trailing cylinders rotatably disposed on the winding side of the shutter and coupled to the leading and trailing screens, respectively;
second leading and trailing cylinders rotatably disposed on the charge side of the shutter and coupled to the leading and trailing screens, respectively;
first driving means for rotating the first leading and trailing cylinders so that the first leading and trailing cylinders are wound with the leading and trailing screens, respectively; and
second driving means for rotating the second leading and trailing cylinders at shutter release so that the second leading and trailing cylinders are wound with the leading and trailing screens, respectively, the improvement wherein:
said first leading cylinder is substantially coaxial with said first trailing cylinder and said second leading cylinder is substantially coaxial with said second trailing cylinder;
said second driving means includes a leading cylinder charge spring for driving the second leading cylinder, a trailing cylinder charge spring for driving the second trailing cylinder, adjusting mechanisms for adjusting the spring force of said charge springs, and straight piercing holes penetrating a camera housing so that the adjusting mechanisms may be adjusted from outside the camera housing through the piercing holes;

said second trailing cylinder of said second driving means includes a pair of winding sections each having a surface facing each corresponding end face of the second leading cylinder; and said adjusting mechanisms of said second driving means include a leading cylinder charge spring adjusting mechanism disposed between one of the winding sections of the second trailing cylinder and the second leading cylinder, and a trailing cylinder charge spring adjusting mechanism disposed between the other winding section of the second trailing cylinder and the second leading cylinder.

23. A focal-plane shutter according to claim 22, wherein each of said leading and trailing cylinder charge spring adjusting mechanisms has one end of each said charge spring corresponding thereto, and includes a rotatable support member coaxial with said second leading and trailing cylinders and being rockable independently thereof, gear teeth formed on the outer peripheral surface of the rotatable support member, and a worm operatively engaging the gear teeth to rotate the rotatable support member.

* * * * *